United States Patent
Ye et al.

(10) Patent No.: US 8,330,705 B2
(45) Date of Patent: Dec. 11, 2012

(54) METHOD OF DRIVING A LIGHT SOURCE, LIGHT SOURCE APPARATUS FOR PERFORMING THE METHOD AND DISPLAY APPARATUS HAVING THE LIGHT SOURCE APPARATUS

(75) Inventors: Byoung-Dae Ye, Yongin-si (KR); Gi-Cherl Kim, Yongin-si (KR); Byung-Choon Yang, Seoul (KR); Sang-Chul Byun, Anyang-si (KR)

(73) Assignee: Samsung Display Co., Ltd. (KR)

( * ) Notice: Subject to any disclaimer, the term of this patent is extended or adjusted under 35 U.S.C. 154(b) by 642 days.

(21) Appl. No.: 12/469,081

(22) Filed: May 20, 2009

(65) Prior Publication Data

US 2010/0141163 A1 Jun. 10, 2010

(51) Int. Cl.
*G09G 3/36* (2006.01)
(52) U.S. Cl. ........................................................ 345/102
(58) Field of Classification Search .................... 345/102
See application file for complete search history.

(56) References Cited

U.S. PATENT DOCUMENTS

| | | | | |
|---|---|---|---|---|
| 7,446,487 B2* | 11/2008 | Ger et al. | ...................... | 315/308 |
| 7,459,866 B2* | 12/2008 | Yu et al. | ...................... | 315/291 |
| 8,059,082 B2* | 11/2011 | Raman et al. | ...................... | 345/102 |
| 2006/0108933 A1* | 5/2006 | Chen | ...................... | 315/86 |
| 2007/0080911 A1 | 4/2007 | Liu et al. | | |
| 2009/0096739 A1* | 4/2009 | Lan et al. | ...................... | 345/102 |

FOREIGN PATENT DOCUMENTS

| | | | |
|---|---|---|---|
| JP | 2007042758 A | | 2/2007 |
| JP | 2008108565 A | | 5/2008 |
| KR | 1020070049735 A | | 5/2007 |

* cited by examiner

*Primary Examiner* — Chanh Nguyen
*Assistant Examiner* — Tsegaye Seyoum
(74) *Attorney, Agent, or Firm* — Cantor Colburn LLP (57) ABSTRACT

A method of driving a light source includes; driving a plurality of light source strings in response to a plurality of driving signals, when a light source module having the plurality of light source strings connected in parallel with each other receives a driving voltage, detecting a detection voltage from channel input terminals of a multichannel current control part, wherein the multichannel current control part controls a resistance difference of the plurality of light source strings based on the plurality of driving signals, and controlling a level of the driving voltage via adjusting a current applied to a feedback terminal of a driving voltage generating part, wherein the driving voltage generating part generates the driving voltage.

20 Claims, 9 Drawing Sheets

METHOD OF DRIVING A LIGHT SOURCE, LIGHT SOURCE APPARATUS FOR PERFORMING THE METHOD AND DISPLAY APPARATUS HAVING THE LIGHT SOURCE APPARATUS

This application claims priority to Korean Patent Application No. 2008-124462, filed on Dec. 9, 2008, and all the benefits accruing therefrom under 35 U.S.C. §119, the contents of which in its entirety are herein incorporated by reference.

BACKGROUND OF THE INVENTION

1. Field of the Invention

Exemplary embodiments of the present invention relate to a method of driving a light source, a light source device for performing the method, and a display device having the light source device. More particularly, exemplary embodiments of the present invention relate to a method of driving a light source for local dimming driving, a light source device performing the method and a display device having the light source device.

2. Description of the Related Art

Generally, liquid crystal display ("LCD") devices have thinner thicknesses, lighter weight and lower power consumption than other types of display devices, and thus LCD devices are widely used, not only for monitors, laptop computers, and cellular phones, but also as widescreen televisions. A typical LCD device includes an LCD panel displaying images using light transmissivity of liquid crystal and a backlight assembly providing the LCD panel with light.

The typical backlight assembly includes a light source that generates light. For example, the light source may be a cold cathode fluorescent lamp ("CCFL"), a hot cathode fluorescent lamp ("HCFL") or a light-emitting diode ("LED"). The use of LEDs is advantageous as a light source for the LCD panel because the LED has low power consumption and high color reproducibility.

Recently, a local dimming method dividing the LCD panel into a plurality of regions and controlling amounts of the light emitted from the backlight based on a gray level of the image displayed in each of the regions has been developed in order to improve the contrast ratio of the image displayed on the LCD device. The local dimming method reduces amounts of light from LEDs by reducing the amount of a driving current provided to the LEDs that are located in a region displaying a darker image than other regions. Additionally, the local dimming method increases the amounts of the light from the LEDs by increasing the amount of the driving current provided to the LEDs that are located in a region displaying a brighter image than other regions.

As described above, the typical backlight assembly includes a plurality of LED strings and a multichannel current controller for providing the driving current to the LED strings connected to each other in parallel when LEDs that are connected to each of the LED strings in series are driven using the local dimming method.

The typical multichannel current controlling circuit generally controls resistance variations among the LED strings so that the driving currents flowing through the LED strings are controlled to be substantially the same as each other. When an LED is shorted in the LED strings, the multichannel current controlling circuit consumes an amount of power corresponding to the shorted LED by producing heat in order to maintain the previously supplied driving current to the remaining LEDs. The shorted LED may damage the multichannel current controlling circuit due to the excess heat generated thereby.

BRIEF SUMMARY OF THE INVENTION

Exemplary embodiments of the present invention provide a method of driving light sources used for protecting a light source device.

Exemplary embodiments of the present invention provide a light source device for performing the above-mentioned method. Exemplary embodiments of the present invention provide a display device having the above-mentioned light source device.

According to one exemplary embodiment of the present invention, a method of driving a light source includes; driving a plurality of light source strings in response to a plurality of driving signals, when a light source module having the plurality of light source strings connected in parallel with each other receives a driving voltage, detecting a detection voltage from channel input terminals of a multichannel current control part, wherein the multichannel current control part controls a resistance difference of the plurality of light source strings based on the plurality of driving signals, and controlling a level of the driving voltage via adjusting a current applied to a feedback terminal of a driving voltage generating part generating, wherein the driving voltage generating part generates the driving voltage.

According to another exemplary embodiment of the present invention, a light source apparatus includes; a light source module including a plurality of light source strings connected in parallel with each other, each of the plurality of light source strings including a plurality of light sources connected in series, a driving voltage generating part including an output terminal which provides the light source module with a driving voltage and a feedback terminal connected to the output terminal, and wherein the driving voltage generating part controls a level of the driving voltage according to a feedback voltage of the feedback terminal, a light source driving part which generates a plurality of driving signals which control the luminance of the plurality of light source strings, a multichannel current control part including a plurality of channel input terminals connected to the plurality of light source strings, and wherein the multichannel current control part controls a resistance difference of the plurality of light source strings based on the plurality of driving signals, and a feedback current control part which adjusts a current applied to the feedback terminal according to a detection voltage detected from the channel input terminal based on the plurality of driving signals.

According to still another exemplary embodiment of the present invention, a display apparatus includes; a display panel, a light source module including a plurality of light source strings connected in parallel with each other, each of the plurality of light source strings including a plurality of light sources connected in series, a driving voltage generating part including; an output terminal which provides the light-source module with a driving voltage, and a feedback terminal connected to the output terminal, wherein the driving voltage generating part controls a level of the driving voltage according to a feedback voltage of the feedback terminal, a light source driving part which generates a plurality of driving signals which control the luminance of the plurality of light source strings, a multichannel current control part including a plurality of channel input terminals connected to the plurality of light source strings, respectively, wherein the multichannel current control part controls a resistance difference of the plurality of light source strings based on the plurality of driving signals, and a feedback current control part which adjusts a flow of a current through the feedback terminal according to a detection voltage detected from the plurality of channel input terminals based on the plurality of driving signals.

According to some exemplary embodiments of the present invention, a driving current applied to light source strings may be controlled by using a detection voltage detected from channel input terminals of a multichannel current control part in real time when a light source apparatus operates. Thus, the power consumed by the multichannel current control part may decrease so that elements of the multichannel current control part may be prevented from being damaged by heat.

BRIEF DESCRIPTION OF THE DRAWINGS

The above and other features and advantages of the present invention will become more apparent by describing in detailed example embodiments thereof with reference to the accompanying drawings, in which.

DETAILED DESCRIPTION OF THE INVENTION

The present invention is described more fully hereinafter with reference to the accompanying drawings, in which exemplary embodiments of the present invention are shown. The present invention may, however, be embodied in many different forms and should not be construed as limited to the example embodiments set forth herein. Rather, these exemplary embodiments are provided so that this disclosure will be thorough and complete, and will fully convey the scope of the present invention to those skilled in the art. In the drawings, the sizes and relative sizes of layers and regions may be exaggerated for clarity. Like reference numerals refer to like elements throughout.

It will be understood that when an element is referred to as being "on," another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above below. The device may be otherwise oriented (rotated 90 degrees or at other orientations) and the spatially relative descriptors used herein interpreted accordingly.

The terminology used herein is for the purpose of describing particular example embodiments only and is not intended to be limiting of the present invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Exemplary embodiments of the invention are described herein with reference to cross-sectional illustrations that are schematic illustrations of idealized example embodiments (and intermediate structures) of the present invention. As such, variations from the shapes of the illustrations as a result, for example, of manufacturing techniques and/or tolerances, are to be expected. Thus, example embodiments of the present invention should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

Hereinafter, exemplary embodiments of the present invention will be explained in detail with reference to the accompanying drawings.

Figure 1:
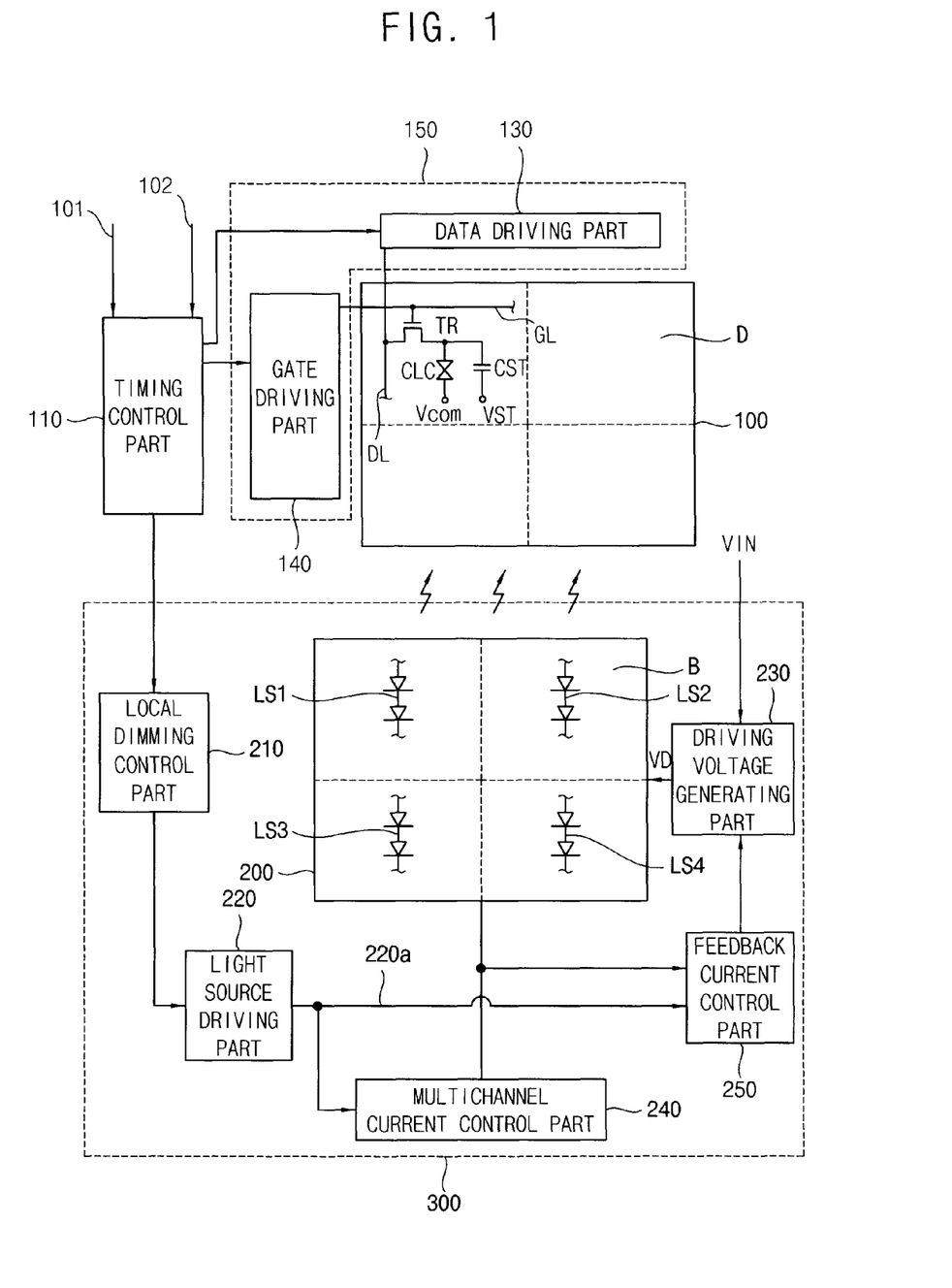
FIG. 1 is a block diagram illustrating an exemplary embodiment of a display apparatus according to the present invention.

FIG. 1 is a block diagram illustrating an exemplary embodiment of a display apparatus according to the present invention.

Referring to FIG. 1, the exemplary embodiment of a display apparatus includes a display panel 100, a timing control part 110, a panel driving part 150 and a light source apparatus 300.

The display panel 100 includes a plurality of pixels, which together may be used to display an image. In one exemplary embodiment, the number of the pixels may be M×N (wherein M and N are natural numbers). Each pixel P includes a switching element TR connected to a gate line GL and a data line DL, a liquid crystal capacitor CLC and a storage capacitor CST that are connected to the switching element TR.

The timing control part 110 receives a control signal 101 and an image signal 102 from an external device. The timing control part 110 generates a timing control signal which controls a driving timing of the display panel 100 using the received control signal. In one exemplary embodiment, the timing control signal includes a clock signal, a horizontal start signal and a vertical start signal.

The panel driving part 150 includes a data driving part 130 and a gate driving part 140.

The data driving part 130 drives the data line DL using a data control signal and an image signal received from the timing control part 110. The data driving part 130 converts the image signal into a data signal, which in one exemplary embodiment is an analog type signal, to output the data line DL. The gate driving part 140 drives the gate line GL using a gate control signal 104c received from the timing control part 110. The gate driving part 140 outputs a gate signal to the gate line GL.

The light source apparatus 300 includes a light source module 200, a local dimming control part 210, a light source driving part 220, a driving voltage generating part 230, a multichannel current control part 240 and a feedback current control part 250.

In the present exemplary embodiment, the light source module 200 is divided into a plurality of light-emitting blocks B, each of the light-emitting blocks including a light source string that includes a plurality of light sources. In one exemplary embodiment the light sources on an individual light source string may be connected in series. In one exemplary embodiment, the light source is a light-emitting diode ("LED") and the light-emitting block is a LED string that has a plurality of LEDs connected in series. In the present exemplary embodiment, the light source module 200 includes a plurality of LED strings LS1, LS2, LS3 and LS4 connected in parallel with each other.

The local dimming control part 210 divides the image signal into a plurality of image blocks D corresponding to the light-emitting blocks B, and generates a dimming control signal controlling the luminance of each of the light-emitting blocks B based on gray-scale of each of the image blocks D.

In one exemplary embodiment the number of image blocks D is the same as the number of light-emitting blocks B.

The light source driving part 220 generates a driving signal 220a of the light-emitting block B based on the dimming control signal received from the local dimming control part 210. In one exemplary embodiment, the driving signal is a pulse width modulation ("PWM") signal. The light source driving part 220 provides the multichannel current control part 240 and the feedback current control part 250 with driving signals 220a of the light-emitting blocks B.

The driving voltage generating part 230 boosts an input voltage VIN to generate a driving voltage VD. The driving voltage VD is provided to a common node (not shown) that is connected in common with first ends of the LED strings LS1, LS2, LS3 and LS4. The driving voltage generating part 230 controls the level of the driving voltage VD to control the feedback current control part 250. In one exemplary embodiment, the driving voltage generating part 230 may be a direct current-to-direct current (DC-DC) converter that boosts the input voltage VIN of about 24 V to generate the driving voltage VD of about 30 V.

The multichannel current control part 240 includes a plurality of channel input terminals connected to second ends of the LED strings LS1, LS2, LS3 and LS4. The multichannel current control part 240 controls a resistance difference of the LED strings LS1, LS2, LS3 and LS4 so that a driving current applied to each of the LED strings LS1, LS2, LS3 and LS4 is substantially uniform.

The feedback current control part 250 is electrically connected to the channel input terminals of the multichannel current control part 240, and detects a detection voltage from the channel input terminals based on the driving signals 220a. The feedback current control part 250 controls a current applied to a feedback terminal of the driving voltage generating part 230 using the detection voltage detected from the channel input terminals. Then, the feedback current control part 250 controls the level of a feedback voltage VFB applied to the feedback terminal. Additionally, the feedback current control part 250 generates a protection signal VPT controlling an operation of the driving voltage generating part 230 using the detection voltage detected from the channel input terminals.

Figure 2:
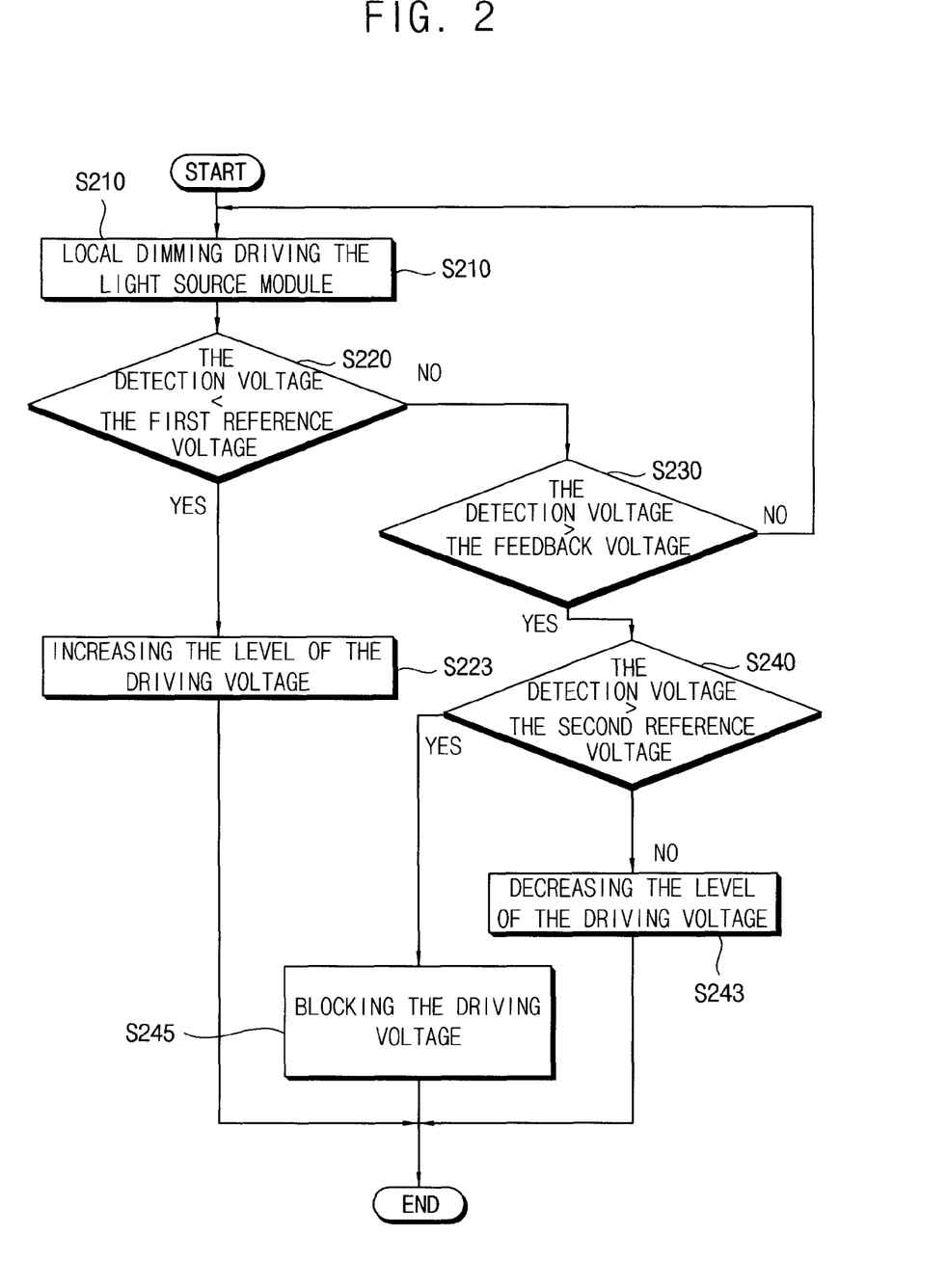
FIG. 2 is a flowchart illustrating an exemplary embodiment of a method of driving an exemplary embodiment of the light source apparatus of FIG. 1.

FIG. 2 is a flowchart illustrating an exemplary embodiment of a method of driving the exemplary embodiment of a light source apparatus 300 of FIG. 1.

Referring to FIGS. 1 and 2, the driving voltage generating part 230 generates the driving voltage VD to provide the light source module 200. The light source module 200 includes the LED strings LS1, LS2, LS3 and LS4 and the driving voltage VD is provided to the first ends of the LED strings LS1, LS2, LS3 and LS4. The light source driving part 220 provides the multichannel current control part 240 with the driving signals 220a controlling the luminance of the LED strings LS1, LS2, LS3 and LS4. Thus, the LED strings LS1, LS2, LS3 and LS4 are individually driven to generate light corresponding to gray-scale of each of the image blocks D. Therefore, the light source module 200 is driven in the local dimming method (step S210).

The feedback current control part 250 detects the detection voltage from the channel input terminals of the multichannel current control part 240 connected to the LED strings LS1, LS2, LS3 and LS4 based on the driving signals 220a to control the voltage level of the driving voltage VD that is an output voltage of the driving voltage generating part 230.

In one exemplary embodiment, a first current feedback part 251 (illustrated in FIG. 4 and discussed in greater detail below) of the feedback current control part 250 decreases the level of a feedback voltage of the feedback terminal via partially allowing a current of the feedback terminal to flow toward ground when the detection voltage is less than a first reference voltage Vref1 (step S220). The driving voltage generating part 230 increases the voltage level of the driving voltage in response to the feedback voltage having the decreased level (step S223). Thereby, the feedback voltage of the feedback terminal is maintained at the driving voltage VD, which is the output voltage of the driving voltage generating part 230, when the detection voltage is greater than the first reference voltage Vref1.

When the detection voltage is greater than the feedback voltage of the feedback terminal (step S230), a protection part 255 (illustrated in FIG. 4 and discussed in greater detail below) compares the detection voltage with a second reference voltage Vref2 (step S240). When the detection voltage is less than the second reference voltage Vref2, the second current feedback part 253 increases the level of the feedback voltage of the feedback terminal via allowing a current to flow toward the feedback terminal. Thus, the driving voltage generating part 230 decreases the level of the driving voltage in response to the feedback voltage having the increased level (step S243).

When the detection voltage is greater than the second reference voltage Vref2, the protection part 255 blocks the driving voltage VD provided to the LED strings LS1, LS2, LS3 and LS4 (step S245).

As described above, the feedback current control part 250 controls the current of the feedback terminal using the detection voltage detected from the channel input terminals of multichannel current control part 240 so that the current flowing on the LED strings LS1, LS2, LS3 and LS4 may be uniformly controlled.

In one exemplary embodiment, when a low current flows through the LED strings LS1, LS2, LS3 and LS4, the feedback current control part 250 controls the driving voltage generating part 230 so that the level of the driving voltage increases. When a high current flows through the LED strings LS1, LS2, LS3 and LS4, the feedback current control part 250 controls the driving voltage generating part 230 so that the level of the driving voltage decreases. Therefore, the current flowing on the LED strings LS1, LS2, LS3 and LS4 may be uniformly controlled according to the resistance difference of the LED strings LS1, LS2, LS3 and LS4. Additionally, when the current applied to the LED strings LS1, LS2, LS3 and LS4 is an overcurrent, the feedback current control part 250 stops the operation of the driving voltage generating part 230. Thus, the multichannel current control part 240 may be protected from high heat.

Figure 3:
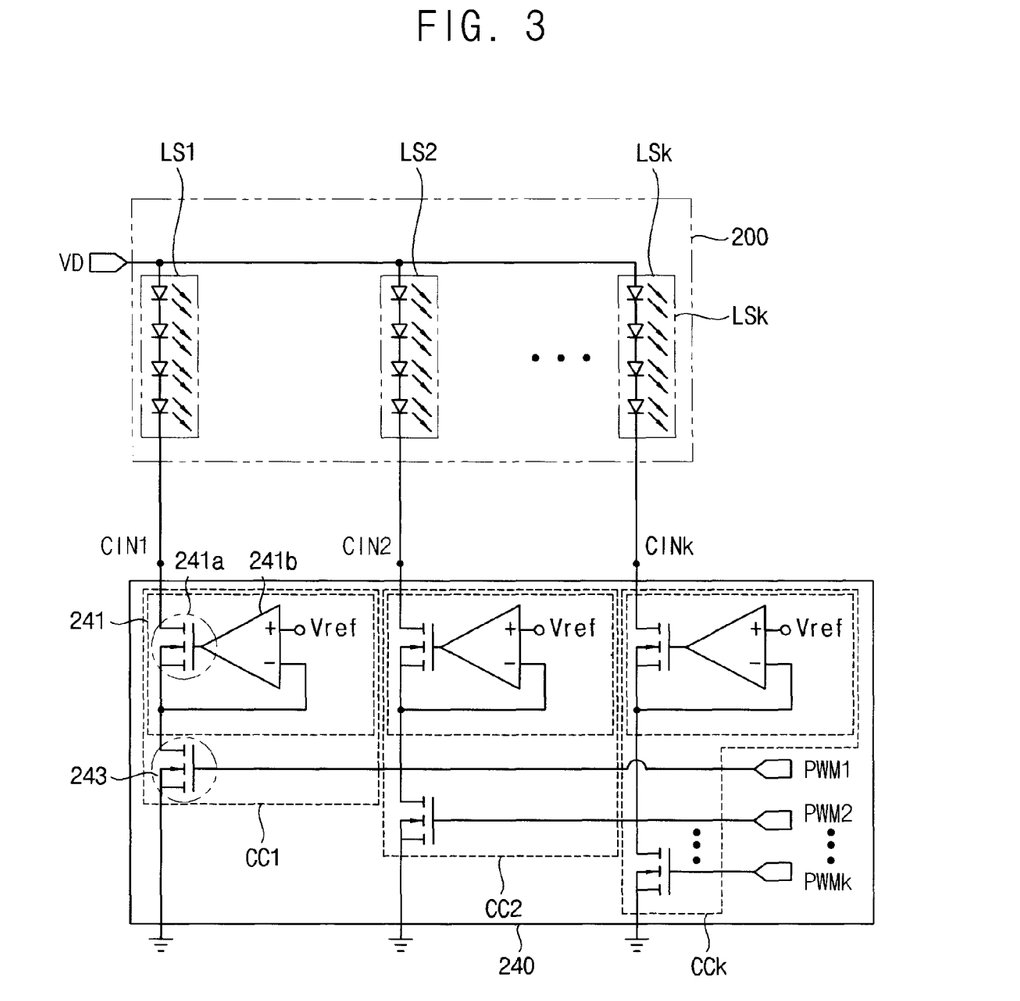
FIG. 3 is a block diagram illustrating an exemplary embodiment of the multichannel current control part of FIG. 1.

FIG. 3 is a block diagram illustrating an exemplary embodiment of the multichannel current control part of FIG. 1.

Referring to FIGS. 1 and 3, the multichannel current control part 240 includes channel input terminals CIN1, CIN2, ..., CINk connected to second ends of the LED strings LS1, LS2, ..., LSk and a plurality of control circuits CC1, CC2, ..., CCk connected to the channel input terminals CIN1, CIN2, ..., CINk, respectively. In the present exemplary embodiment, each of the control circuits includes a current controller and a driving transistor. In one exemplary embodiment, a first control circuit CC1 includes a first current controller 241 and a first driving transistor 243. The first current controller 241 includes a control transistor 241a and an operational amplifier 241b. An input electrode of the control transistor 241a is connected to a first channel input terminal CIN1 electrically connected to the second end of the first LED string LS1. An output electrode of the control transistor 241a is electrically connected to an input electrode of the first driving transistor 243.

A first input terminal of the operational amplifier 241b receives a reference voltage Vref. An input terminal of the operational amplifier 241b is connected to the output electrode of the control transistor 241a, and receives an output voltage of the control transistor 241a. An output terminal of the operational amplifier 241b is electrically connected to a control electrode of the control transistor 241a, and outputs a control signal to the control transistor 241a. The operational amplifier 241b compares the output voltage of the control transistor 241a with the reference voltage Vref to feedback the output voltage so that the output voltage approaches the reference voltage Vref. Accordingly, the driving current applied to the first LED string LS1 is controlled to have a predetermined value, e.g., via pulse modulation due to the configurations of the control transistor 241a, the operation amplifier 241b and the reference voltage Vref.

As described above, the control transistor 241a may serve as a variable resistor to have a resistance controlled by the operational amplifier 241b. In one exemplary embodiment, when the driving current applied to the first LED string LS1 is greater than a reference value, the resistance of the control transistor 241a may increase so that the driving current may decrease. When the driving current is less than the reference value, the resistance of the control transistor 241a may decrease so that the driving current may increase.

An input electrode of the first transistor 243 is electrically connected to an output terminal of the first current controller 241 that is the output electrode of the control transistor 241a. An output electrode of the first driving transistor 243 is connected to ground, and a control electrode of the control transistor 241a receives a driving signal PWM1. The first driving transistor 243 is turned on and turned off in response to the driving signal PWM1 to control emitting light of the first LED string LS1.

Second to k-th control circuits CC2, ..., CCk are substantially the same as the first control circuit CC1 so that any further repetitive explanation will be omitted. Therefore, the driving currents applied to the first to k-th LED strings LS1, LS2, ..., LSk are controlled to have a predetermined value by the first to k-th control circuits CC1, ..., CCk.

Figure 4:
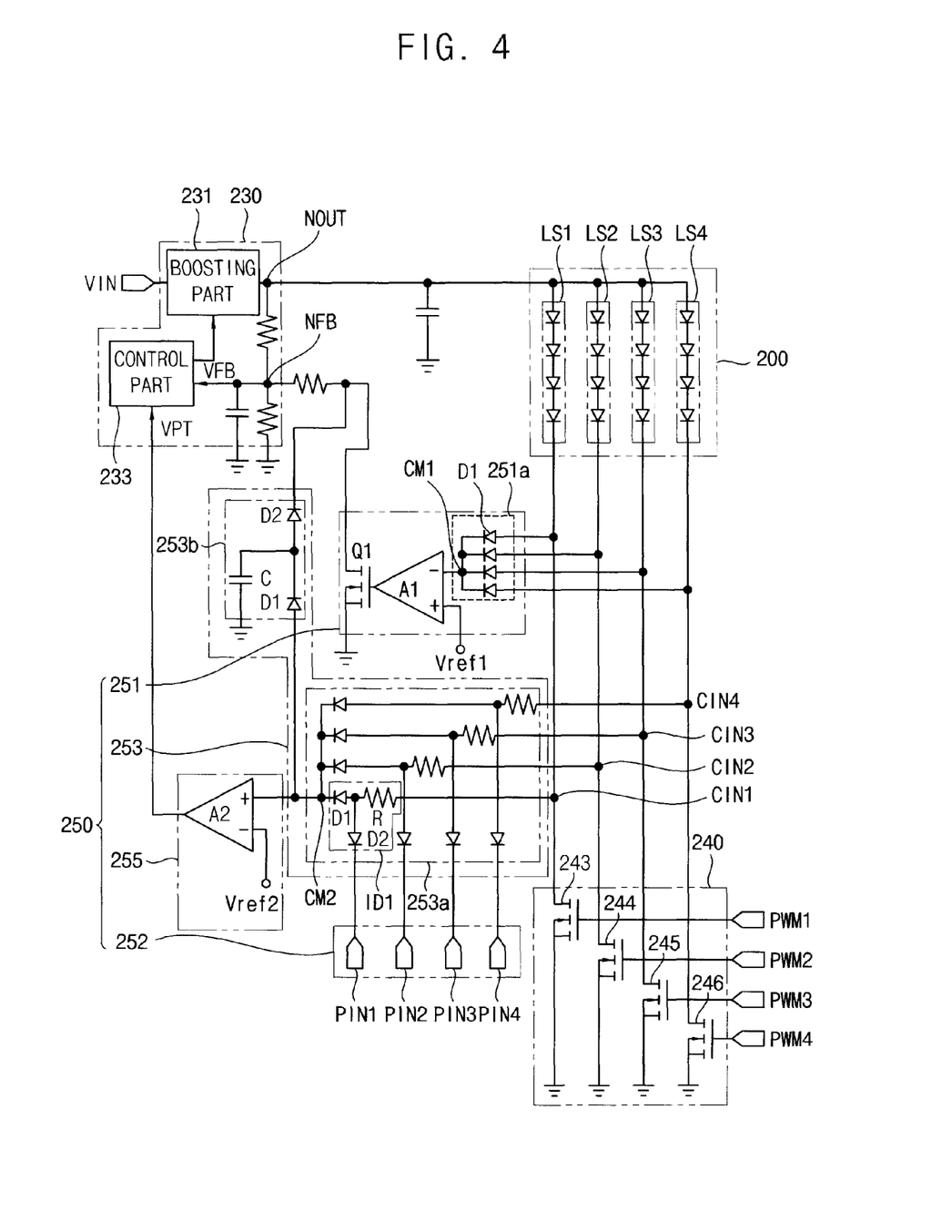
FIG. 4 is a circuit diagram illustrating an exemplary embodiment of the light source apparatus of FIG. 1.

FIG. 4 is an exemplary embodiment of a circuit diagram illustrating the exemplary embodiment of a light source apparatus of FIG. 1.

Referring to FIGS. 1 and 4, the light source apparatus 300 includes the light source module 200, the driving voltage generating part 230, the multichannel current control part 240 and the feedback current control part 250. The light source module 200 includes the LED strings LS1, LS2, LS3 and LS4.

The driving voltage generating part 230 includes a boosting part 231 and a control part 233. The boosting part 231 boosts the input voltage VIN to output the driving voltage VD. The control part 233 controls the level of the driving voltage VD based on the feedback voltage received from the feedback terminal. The control part 233 controls whether the boosting part 231 operates by using the protecting signal VPT received from the feedback current control part 250.

The multichannel current control part 240 is electrically connected to the LED strings LS1, LS2, LS3 and LS4. The multichannel current control part 240 drives the LED strings LS1, LS2, LS3 and LS4 in response to the driving signals PWM1, PWM2, PWM3, PWM4 received from the light source driving part 220 so that a voltage difference of the LED strings LS1, LS2, LS3 and LS4 is diverted, e.g., in one exemplary embodiment it is consumed to generate heat. In one exemplary embodiment, when the current applied to each of the LED strings LS1, LS2, LS3 and LS4 is about 50 mA, a voltage Vf1 applied to both ends of the first LED string LS1 is about 50 V, a voltage Vf2 applied to both ends of the second LED string LS2 is about 51 V, a voltage Vf3 applied to both ends of the third LED string LS3 is about 49 V, and a voltage Vf4 applied to both ends of the fourth LED string LS4 is about 51.5 V. As described above, the LED strings LS1, LS2, LS3 and LS4 may have different voltages applied thereto. The multichannel current control part 240 consumes the voltage differences 1.5 V, 0.5 V, 2.5 V and 0 V of the LED strings LS1, LS2, LS3 and LS4, respectively, as heat so that the current applied to the LED strings LS1, LS2, LS3 and LS4 may be controlled to have substantially the same value.

The feedback current control part 250 detects the detection voltage from the channel input terminals CIN1, CIN2, CIN3 and CIN4 of the multichannel current control part 240 electrically connected to the LED strings LS1, LS2, LS3 and LS4 based on the driving signals PWM1, PWM2, PWM3 and PWM4 to control the level of the driving voltage VD output from the driving voltage generating part 230.

The feedback current control part 250 includes a first current feedback part 251, a signal input part 252, a second current feedback part 253 and a protection part 255.

In the present exemplary embodiment, the first current feedback part 251 includes a first rectification part 251a, a first comparator A1 and a transistor Q1. The first rectification part 251a includes a plurality of diodes D1 connected to the channel input terminals CIN1, CIN2, CIN3 and CIN4 of the multichannel current control part 240. Anodes of the diodes D1 are connected to the second ends of the LED strings LS1, LS2, LS3 and LS4, respectively, and cathodes of the diodes D1 are electrically connected to a first input terminal of the first comparator A1 through a first common node CM1. A first reference terminal of the first comparator A1 receives a first reference voltage Vref1, and an output terminal of the first comparator A1 is connected to a control electrode of the transistor Q1. An input electrode of the transistor Q1 is connected to the feedback terminal NFB, and an output electrode of the transistor Q1 is connected to ground.

The signal input part 252 includes first to fourth input terminals PIN1, PIN2, PIN3 and PIN4 receiving the driving signals PWM1, PWM2, PWM3 and PWM4 provided from the light source driving part 220. In one exemplary embodiment, these are the same driving signals PWM1, PWM2, PWM3 and PWM4 provided to the multichannel current control part 240.

The second current feedback part 253 includes a detection part 253a and a second rectification part 253b. The detection part 253a includes a plurality of detection circuits connected to the channel input terminals CIN1, CIN2, CIN3 and CIN4 of the multichannel current control part 240, respectively. A first diction circuit ID1 includes a resistor R, a first diode D1 and a second diode D2. The resistor R is connected to the first channel input terminal CIN1 in series. The first diode D1 includes an anode connected to the resistor R and a cathode connected to a second common node CM2 that is commonly connected to the remaining detection circuits. The second diode D2 includes an anode connected between the first diode D1 and the resistor R, and a cathode connected to a first input terminal PIN1 receiving the driving signal PWM1. Exemplary embodiments include configurations wherein the detection part 253a may include a plurality of detection circuits, and one exemplary embodiment includes a configuration wherein the detection part 253a has the same number of detection circuits as the number of LED strings.

The second rectification part 253b includes a first diode D1, a second diode D2 and a capacitor C. The first diode includes an anode connected to the second common node CM2 and a cathode connected to the second diode D2. The second diode D2 includes an anode connected to the first diode D1 and a cathode connected to the feedback terminal NFB. In one exemplary embodiment, the second diode D2 may be connected to the feedback terminal NFB via a resistor as shown in FIG. 4. The capacitor includes a first end connected between the first and second diodes D1 and D2, and a second end connected to ground.

The protection part 255 includes a second comparator A2. The second comparator A2 includes a second input terminal connected to the second common node CM2, a second reference terminal receiving a second reference voltage Vref2 and an output terminal connected to the control part 233. The second comparator A2 compares the second reference voltage Vref2 with the voltage applied to the second common node CM2, e.g., a detection voltage, to output the protection signal VPT. The control part 233 controls whether the boosting part 231 operates in response to the protection signal VPT. In one exemplary embodiment, the voltage level of the second reference voltage Vref2 may be determined according to the number of the shorted LEDs in the light source module 200.

Figure 5:
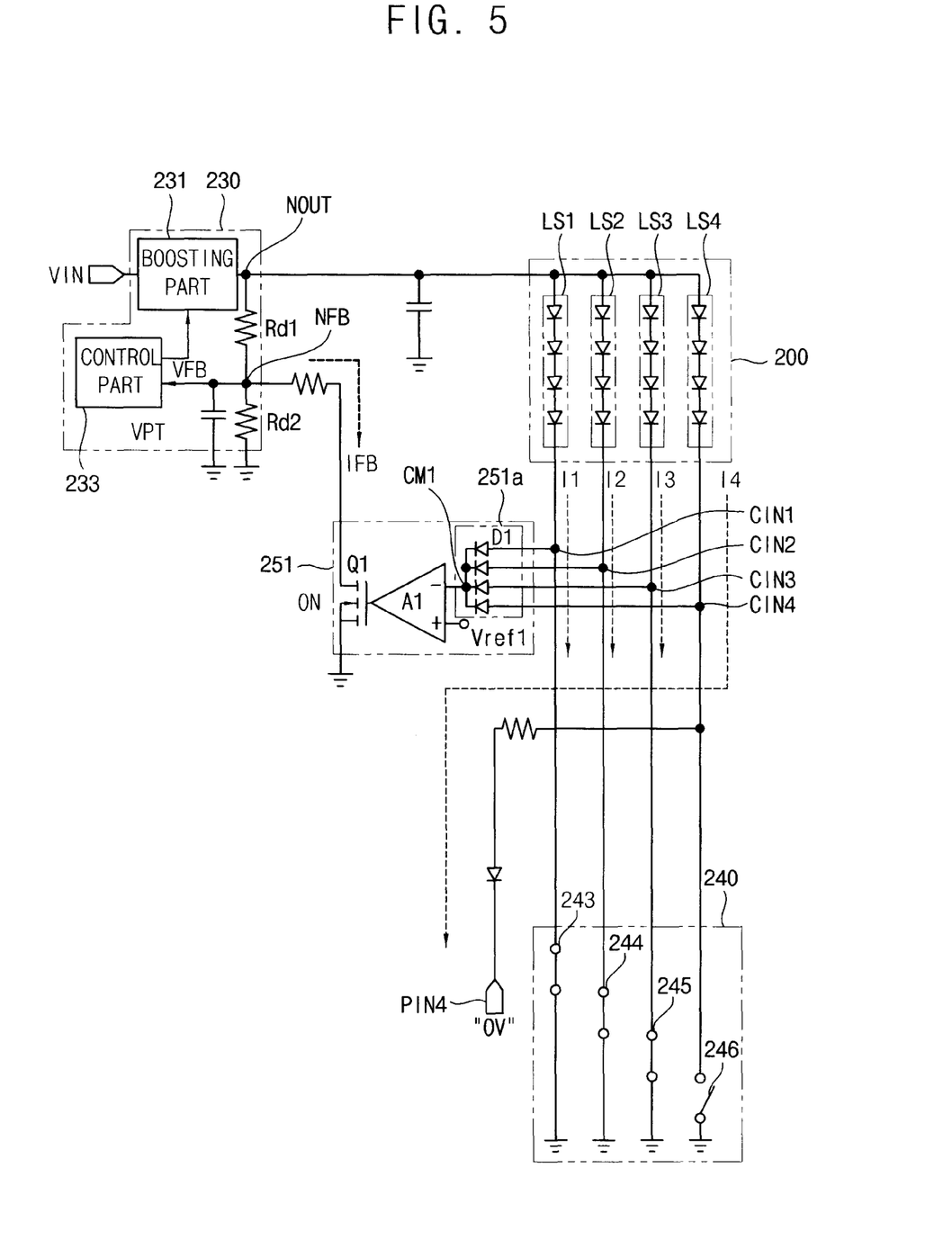
FIG. 5 is a circuit diagram illustrating an exemplary embodiment of a method of driving the exemplary embodiment of a first current feedback part of FIG. 4.

FIG. 5 is a circuit diagram illustrating an exemplary embodiment of a method of driving the exemplary embodiment of a first current feedback part 251 of FIG. 4.

Referring to FIGS. 4 and 5, a method of increasing the level of the driving voltage VD will be described when the driving current applied to the LED strings LS1, LS2, LS3 and LS4 is less than a normal current.

In one exemplary embodiment, the first, second and third LED strings LS1, LS2 and LS3 receive the driving signals PWM1, PWM2 and PWM3 having a high level of "1", and the fourth LED string LS4 receives the driving signal PWM4 having a low level of "0".

The driving transistors 243, 244 and 245 of the multichannel current control part 240 connected to the first, second and third LED strings LS1, LS2 and LS3 are turned on in response to the driving signals PWM1, PWM2 and PWM3 having a high level of "1", so that the first, second and third LED strings LS1, LS2 and LS3 emit light. The driving transistor 246 of the multichannel current control part 240 is turned off in response to the driving signal PWM4 so that the fourth LED string LS4 does not emit light. In particular, because the driving transistor 246 is turned off, no connection to ground is established for the LED string LS4 through the multichannel control part 240.

The first, second and third LED strings LS1, LS2 and LS3 are electrically connected to the multichannel current control part 240 so that first, second and third driving currents I1, I2 and I3 applied to the first, second and third LED strings LS1, LS2 and LS3 flow toward ground through the multichannel current control part 240. The fourth LED string LS4 is electrically cut off from ground by the multichannel current control part 240 so that a fourth driving current I4 applied to the fourth LED string LS4 flows toward the fourth input terminal PIN4 having the low level of "0" through the detection part 253a.

The first rectification part 251a of the first current feedback part 251 rectifies the driving currents I1, I2, I3 and I4 applied to the channel input terminals CIN1, CIN2, CIN3 and CIN4 to provide the first common node CM1. Thus, the first common node CM1 is applied with the detection voltage detected from the channel input terminals CIN1, CIN2, CIN3 and CIN4. As a result, the first input terminal of the first comparator A1 receives the detection voltage.

The first, second, third and fourth driving currents I1, I2, I3 and I4 are less than the normal current so that the detection voltage is less than the first reference voltage Vref1 received by the first reference terminal of the first comparator A1. The first comparator A1 outputs a comparison signal of a high level when the detection voltage applied to the first common node CM1 is less than the first reference voltage Vref1.

When the transistor Q1 of the first current feedback part 251 receives the comparison signal of the high level, the transistor Q1 is turned on. Thus, a feedback current IFB applied to the feedback terminal NFB flows toward ground through the transistor Q1. The first comparator A1 outputs a comparison signal of a low level when the detection voltage applied to the first common node CM1 is greater than the first reference voltage Vref1.

When the transistor Q1 of the first current feedback part 251 receives the comparison signal of the low level, the transistor Q1 is turned off. When the transistor Q1 is turned off, the feedback terminal NFB is electrically cut off from the first current feedback part 251. The driving voltage VA that is applied to an output terminal NOUT of the driving voltage generating part 230 is divided by division resistors Rd1 and Rd2.

Therefore, when feedback voltage VFB of the feedback terminal NFB decreases, the decreased feedback voltage VFB is provides to the control part 233. The control part 233 controls the boosting part 231 in response to the decreased feedback voltage VFB so that the boosting part 231 increases the level of the driving voltage VD.

As a result, when the driving currents applied to the LED strings LS1, LS2, LS3 and LS4 is less than the normal current, the feedback current IFB flows toward ground via the first current feedback part 251. Thus, the feedback voltage VFB of the feedback terminal NFB decreases so that the level of the driving voltage VD may be increased by the driving voltage generating part 230.

Figure 6:
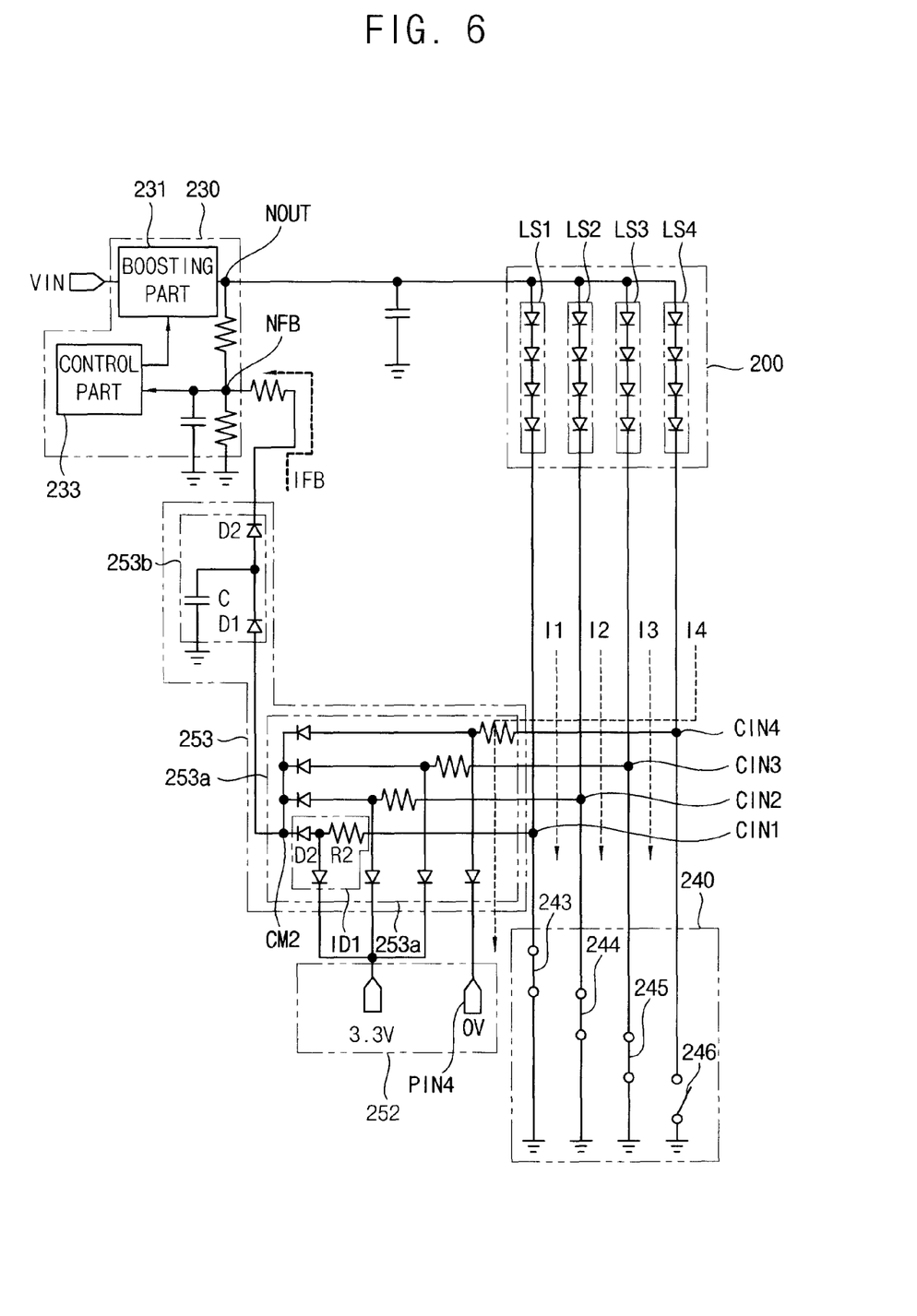
FIG. 6 is a circuit diagram illustrating an exemplary embodiment of a method of driving the exemplary embodiment of a second current feedback part of FIG. 4.

FIG. 6 is a circuit diagram illustrating an exemplary embodiment of a method of driving the exemplary embodiment of a second current feedback part 253 of FIG. 4.

Referring to FIGS. 4 and 6, a method of decreasing the level of the driving voltage VD will be described when the driving current applied to the LED strings LS1, LS2, LS3 and LS4 is greater than the normal current.

When the driving current applied to the LED strings LS1, LS2, LS3 and LS4 is greater than the normal current, the first comparator A1 of the first current feedback part 251 receives the detection voltage having a high level. The first comparator A1 provides the transistor Q1 with the comparison signal having the low level, so that the transistor Q1 is turned off. When the transistor Q1 is turned off, the feedback terminal NFB is electrically cut off from the ground terminal by the first current feedback part 251. Therefore, when the driving current applied to the LED strings LS1, LS2, LS3 and LS4 is the high current, the second current feedback part 253 is driven as follows.

In the present exemplary embodiment, similar to the exemplary embodiment described with respect to FIG. 5, the first, second and third LED strings LS1, LS2 and LS3 receive the driving signals PWM1, PWM2 and PWM3 having a high level of "1", and the fourth LED string LS4 receives the driving signal PWM4 having a low level of "0".

The driving transistors 243, 244 and 245 of the multichannel current control part 240 connected to the first, second and third LED strings LS1, LS2 and LS3 are turned on in response to the driving signals PWM1, PWM2 and PWM3 having a high level of "1", so that the first, second and third LED strings LS1, LS2 and LS3 emit light. The driving transistor 246 of the multichannel current control part 240 is turned off in response to the driving signal PWM4 so that the fourth LED string LS4 does not emit light. In the present exemplary embodiment, the driving signal having the high level is about 3.3 V. Thus, driving currents I1, I2, I3 and I4 flows through the LED strings LS1, LS2, LS3 and LS4, respectively.

The first, second and third driving currents I1, I2 and I3 applied to the first, second and third LED strings LS1, LS2 and LS3 flow toward the second common node CM2 through the detection circuit ID1, and the other detection circuits of the detection part 253a which are shown but not individually labeled. The fourth LED string LS4 is electrically cut off from the ground by the multichannel current control part 240 so that fourth driving current I4 applied to the fourth LED string LS4 flows toward the fourth input terminal PIN4 having the low level of "0" through the detection part 253a.

The second common node CM2 is applied with the detection voltage detected from the channel input terminals CIN1, CIN2, CIN3 and CIN4. The detection voltage applied to the second common node CM2 has a high level according to the first, second and third driving currents I1, I2 and I3 that have high levels.

When the detection voltage applied to the second common node CM2 is greater than a voltage applied to the feedback terminal NFB, the feedback current IFB flows toward the feedback terminal NFB through the second rectification part 253b. The feedback voltage applied to the feedback terminal NFB increases due to the feedback current IFB so that the control part 233 receives the increased feedback voltage VFB. Thus, the control part 233 controls the boosting part 231 in response to the increased feedback voltage VFB so that the boosting part 231 decreases the level of the driving voltage VD.

As a result, when the driving currents applied to the LED strings LS1, LS2, LS3 and LS4 is greater than the normal current, the feedback current IFB flows toward the feedback terminal NFB via the second current feedback part 253. Thus, the feedback voltage VFB of the feedback terminal NFB increases so that the level of the driving voltage VD decreases.

Figure 7:
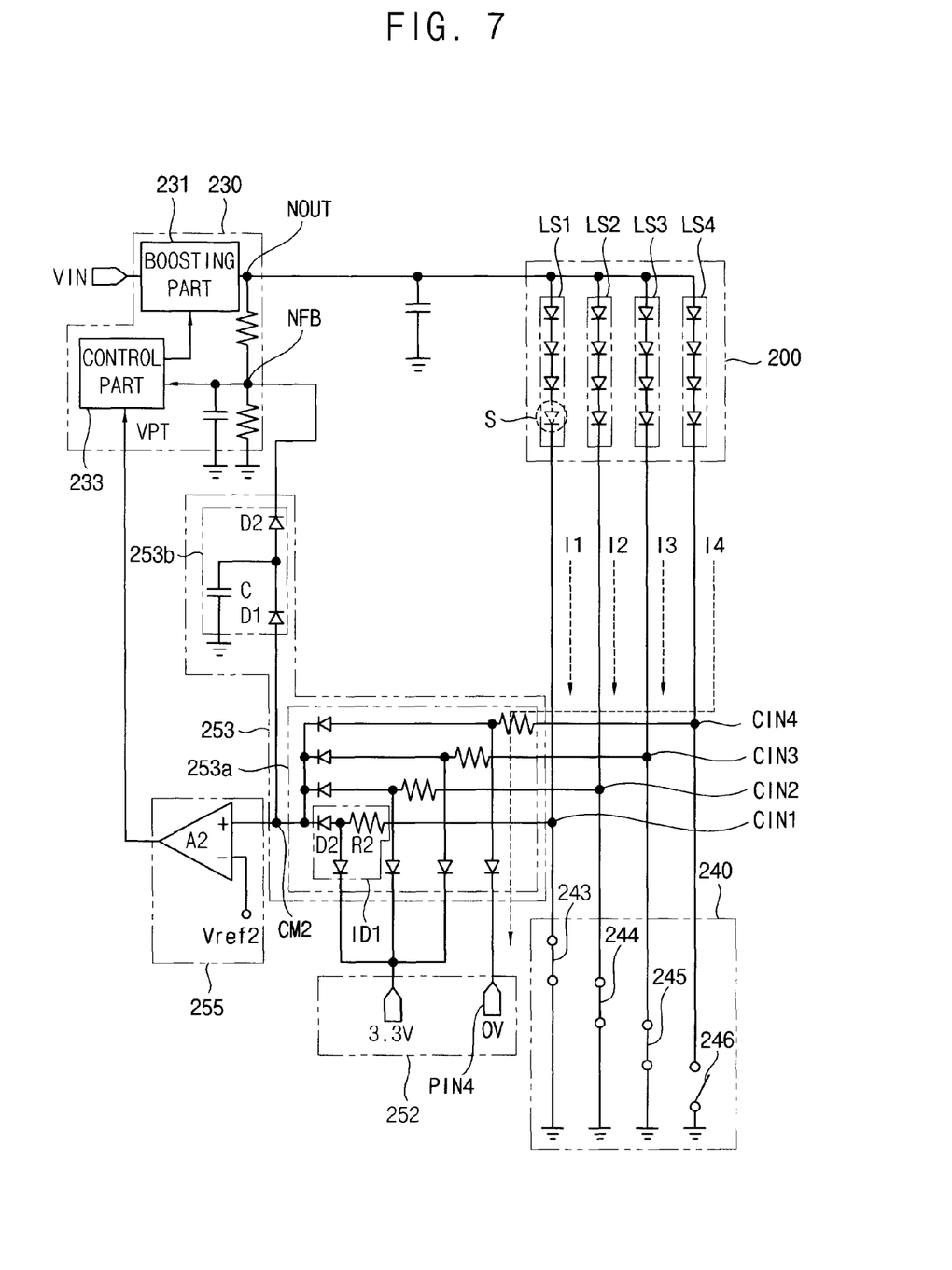
FIG. 7 is a circuit diagram illustrating an exemplary embodiment of a method of driving the exemplary embodiment of a protection part of FIG. 4.

FIG. 7 is a circuit diagram illustrating an exemplary embodiment of a method of driving the exemplary embodiment of a protection part 255 of FIG. 4.

Referring to FIGS. 4 and 7, a method of driving of the protection part 255 will be described when the driving current applied to the LED strings LS1, LS2, LS3 and LS4 is an overcurrent due to an LED string having a shorted LED.

In the present exemplary embodiment, the first, second and third LED strings LS1, LS2 and LS3 receive the driving signals PWM1, PWM2 and PWM3 having a high level of "1", and the fourth LED string LS4 receives the driving signal PWM4 having a low level of "0", similar to that described above with respect to the previous exemplary embodiments.

When the first LED string LS1 includes the shorted LED S, the multichannel current control part 240 abnormally increases a voltage of the channel input terminal CIN1 connected to the first LED string LS1 to compensate for the voltage difference of the LED strings LS1, LS2, LS3 and LS4.

The first detection circuit ID1 connected to the first LED string LS1 receives an abnormal voltage applied to the channel input terminal CIN1. Thus, the abnormal voltage is applied to a second comparator A2 of the protection part 255 through the second common node CM2. The second comparator A2 compares the abnormal voltage with the second reference voltage Vref2 to output the protection signal VPT. The protection signal VPT is provides to the control part 233.

In the present exemplary embodiment, the second comparator A2 outputs the protection signal VPT having a high level when the voltage of the second common node CM2 is greater than the second reference voltage Vref2, and outputs the protection signal VPT of a low level when the voltage of the second common node CM2 is less than the second reference voltage Vref2. The control part 233 controls the boosting part 231 in response to the protection signal VPT of the high level so that the boosting part 231 blocks the driving voltage provided to the light source module 200. As a result, the driving voltage VD is not applied to the light source module 200 so that the light source module 200 does not emit light. As described in the exemplary embodiment above, the level of the second reference voltage Vref2 is determined so that if one LED is shorted the voltage applied to the second common node CM2 will be greater than the second reference voltage Vref2. However, alternative exemplary embodiments include configurations wherein the level of the second reference voltage Vref2 may be determined to correspond to a larger number of shorted LEDs, e.g., by increasing the second reference voltage Vref2 accordingly.

As described above, when an LED is shorted, the multichannel current control part 240 consumes an amount of power corresponding to the shorted LED by producing heat in order to compensate for the voltage difference. Therefore, by configuring the feedback current control part 250 to send a signal to the driving voltage generating part 230 to cut off power to the light source module when a short is detected, elements of the multichannel current control part 240 may be prevented from being damaged by heat.

Figure 8A:
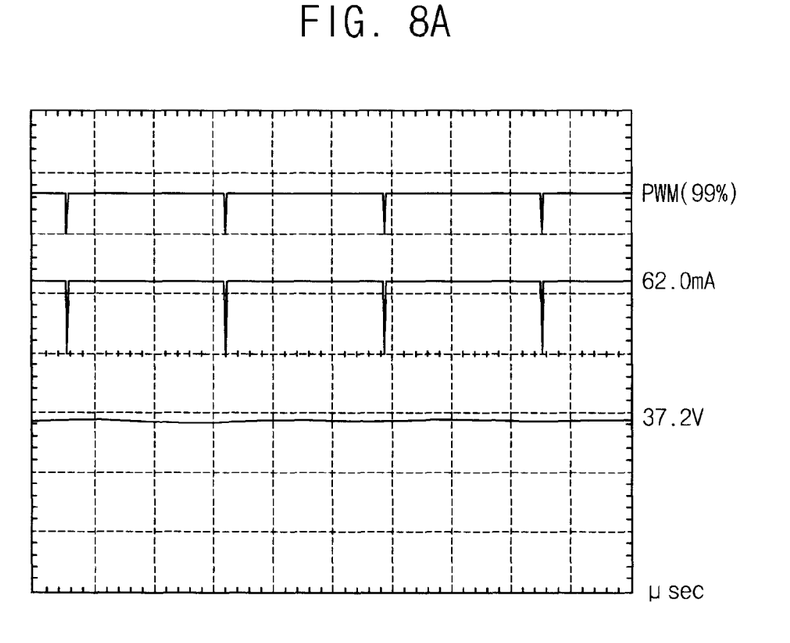
FIGS. 8A to 8C are waveform diagrams illustrating efficiency of exemplary embodiments of a display apparatus according to the present invention.
Figure 8B:
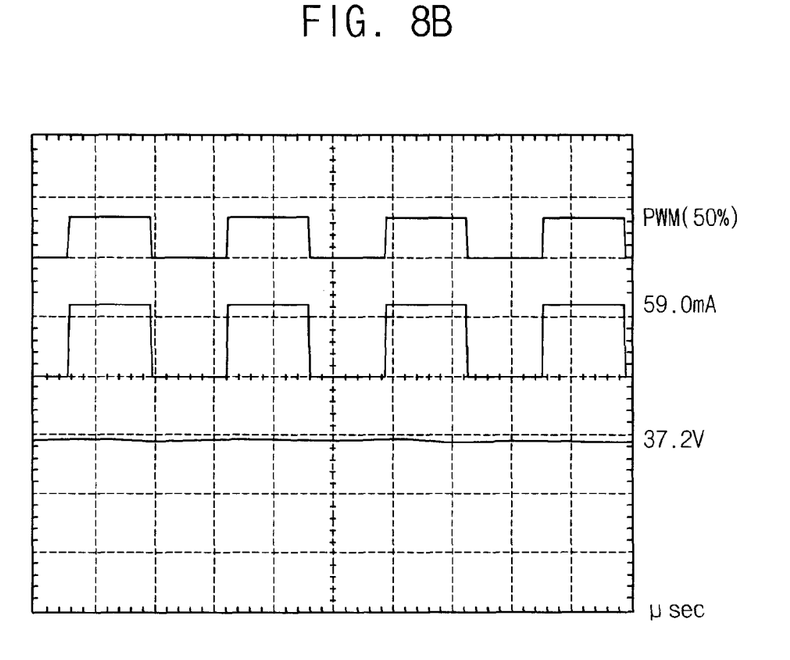
Figure 8C:
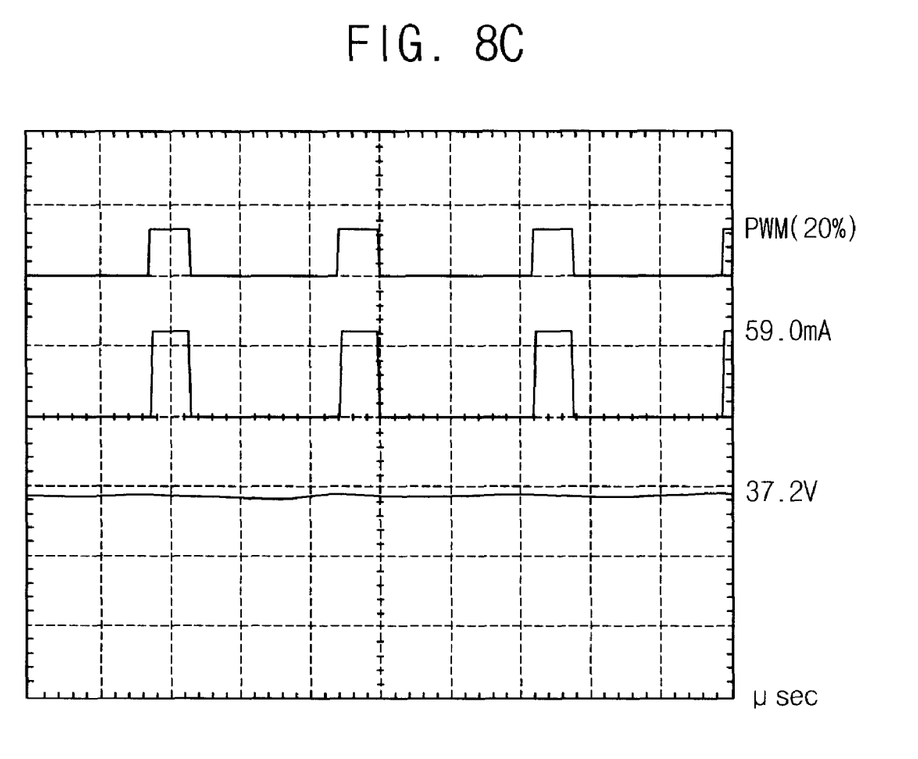

FIGS. 8A to 8C are waveform diagrams illustrating efficiency of exemplary embodiments of a display apparatus according to the present invention.

FIGS. 8A to 8C are waveform diagrams illustrating the driving current and the driving voltage corresponding to the first LED string LS1 in accordance with a change of the driving signal in the light source apparatus of FIG. 4.

Referring to FIGS. 4 and 8A, the first LED string LS1 received the driving signal having a duty ratio of 99%. The driving current applied to the first LED string LS1 was about 62.0 mA, and the driving voltage that was an input voltage received by the first LED string LS1 was about 37.2 V. That is, the driving voltage was provided from the driving voltage generating part 230.

Referring to FIG. 8B, the first LED string LS1 received the driving signal having a duty ratio of 50%. The driving current applied to the first LED string LS1 was about 59.0 mA, and the driving voltage that was the input voltage received by the first LED string LS1 was about 37.2 V.

Referring to FIG. 8C, the first LED string LS1 received the driving signal having a duty ratio of 20%. The driving current applied to the first LED string LS1 was about 59.0 mA, and the driving voltage that was the input voltage received by the first LED string LS1 was about 37.2 V.

Referring to FIGS. 8A to 8C, the driving current applied to the first LED string LS1 was about 60 mA irrespective of the application of different duty ratios, e.g., 99%, 50% and 20%. Thus, the driving current applied to the first LED string LS1 was uniformly about 60 mA so that the driving voltage generating part 230 uniformly output the driving voltage of about 37 V.

Therefore, the light source apparatus 300 controlled the feedback voltage applied to the feedback terminal of the driving voltage generating part 230 according to the driving current applied to the LED strings LS1, LS2, LS3 and LS4 using the feedback current control part 250, so that the driving current applied to the LED strings LS1, LS2, LS3 and LS4 was maintained to be substantially uniform. Thus, the power consumed by the multichannel current control part 240 may decrease.

According to the present invention, a driving current applied to light source strings may be controlled using a detection voltage detected from channel input terminals of a multichannel current control part in real time when a light source apparatus operates. Thus, the power consumed by the multichannel current control part may decrease so that elements of the multichannel current control part may be prevented from being damaged by heat.

In addition, a light source apparatus and a display apparatus having the light source apparatus may be protected by blocking a driving voltage provided to a light source apparatus when an LED is shorted.

The foregoing is illustrative of the present invention and is not to be construed as limiting thereof. Although a few example embodiments of the present invention have been described, those skilled in the art will readily appreciate that many modifications are possible in the example embodiments without materially departing from the novel teachings and advantages of the present invention. Accordingly, all such modifications are intended to be included within the scope of the present invention as defined in the claims. In the claims, means-plus-function clauses are intended to cover the structures described herein as performing the recited function and not only structural equivalents but also equivalent structures. Therefore, it is to be understood that the foregoing is illustrative of the present invention and is not to be construed as limited to the specific example embodiments disclosed, and that modifications to the disclosed example embodiments, as well as other example embodiments, are intended to be included within the scope of the appended claims. The present invention is defined by the following claims, with equivalents of the claims to be included therein.

What is claimed is:

1. A method of driving a light source, the method comprising:
   driving a plurality of light source strings in response to a plurality of driving signals, when a light source module having the plurality of light source strings connected in parallel with each other receives a driving voltage;
   detecting a detection voltage from channel input terminals of a multichannel current control part, wherein the multichannel current control part controls a resistance difference of the plurality of light source strings based on the plurality of driving signals; and
   controlling a level of the driving voltage via adjusting a current applied to a feedback terminal of a driving voltage generating part, wherein the driving voltage generating part generates the driving voltage;
   wherein controlling the level of the driving voltage comprises:
   decreasing a level of a feedback voltage of the feedback terminal by connecting the feedback terminal to ground when the detection voltage is less than a first reference voltage; and
   increasing the level of the feedback voltage of the feedback terminal by at least partially flowing a current to the feedback terminal when the detection voltage is greater than the feedback voltage.

2. The method of claim 1, further comprising:
   generating a plurality of dimming control signals, the light source module being divided into a plurality of light-emitting blocks, at least one of the plurality of light source strings being respectively disposed in each of the plurality of light-emitting blocks, the plurality of dimming control signals controlling the luminance of the plurality of light-emitting blocks according to grayscales of a plurality of image blocks, an image signal being divided into the plurality of image blocks corresponding to the plurality of light-emitting blocks, wherein the plurality of driving signals are generated based on the plurality of dimming control signals corresponding to the plurality of light-emitting blocks.

3. The method of claim 1, wherein controlling the level of the driving voltage comprises:

decreasing the level of a feedback voltage of the feedback terminal by connecting the feedback terminal to ground when the voltage level of the detection voltage is less than the voltage level of the first reference voltage; and increasing the level of the driving voltage in response to the feedback voltage having the decreased level.

4. The method of claim 1, wherein controlling the level of the driving voltage comprises:

increasing the level of the feedback voltage of the feedback terminal by at least partially flowing the current to the feedback terminal when the detection voltage is greater than the feedback voltage; and decreasing the level of the driving voltage in response to the feedback voltage having the increased level.

5. The method of claim 1, further comprising:

controlling an operation of the driving voltage generating part according to the detection voltage detected from the channel input terminals.

6. The method of claim 5, wherein controlling the operation of the driving voltage generating part comprises:

blocking the driving voltage provided to the light source strings when the detection voltage is greater than a second reference voltage.

7. A light source apparatus comprising:

a light source module including a plurality of light source strings connected in parallel with each other, each of the plurality of light source strings including a plurality of light sources connected in series;

a driving voltage generating part including an output terminal which provides the light source module with a driving voltage and a feedback terminal connected to the output terminal, and wherein the driving voltage generating part controls a level of the driving voltage according to a feedback voltage of the feedback terminal;

a light source driving part which generates a plurality of driving signals which control the luminance of the plurality of light source strings;

a multichannel current control part including a plurality of channel input terminals connected to the plurality of light source strings, and wherein the multichannel current control part controls a resistance difference of the plurality of light source strings based on the plurality of driving signals;

a feedback current control part which adjusts a current applied to the feedback terminal according to a detection voltage detected from the channel input terminal based on the plurality of driving signals;

a first current feedback part which decreases a level of a feedback voltage of the feedback terminal by connecting the feedback terminal to ground when the detection voltage is less than a first reference voltage; and a second current feedback part which increases the level of the feedback voltage of the feedback terminal by at least partially flowing a current to the feedback terminal when the detection voltage is greater than the feedback voltage.

8. The light source apparatus of claim 7, further comprising:

a local dimming control part which generates a plurality of dimming control signals;

wherein the light source module is divided into a plurality of light-emitting blocks, at least one of the plurality of light source strings is respectively disposed in each of the plurality of light-emitting blocks, the plurality of dimming control signals control the luminance of the plurality of light-emitting blocks according to grayscales of a plurality of image blocks, an image signal is divided into the plurality of image blocks corresponding to the plurality of light-emitting blocks, and the plurality of driving signals are generated based on the plurality of dimming control signals corresponding to the plurality of light-emitting blocks.

9. The light source apparatus of claim 7, wherein the feedback current control part comprises:

a signal input part including a plurality of signal input terminals which receives the driving signals, the plurality of signal input terminals being electrically connected to the plurality of channel input terminals, respectively;

a protection part which blocks the driving voltage provided to the plurality of light source strings when the detection voltage is greater than a second reference voltage.

10. The light source apparatus of claim 9, wherein the first current feedback part comprises:

a first rectifying part including a plurality of diodes, each of the plurality of diodes having an anode connected to one of the plurality of channel input terminals, and each of the plurality of diodes having a cathode connected to a first common node;

a first comparator including a first input terminal connected to the first common node and a first reference terminal receiving the first reference voltage; and a transistor including a control electrode connected to an output terminal of the first comparator, an input electrode connected to the feedback terminal and an output electrode connected to ground.

11. The light source apparatus of claim 9, wherein the second current feedback part comprises:

a detecting part including a plurality of detecting circuits, each of the plurality of detecting circuits being connected to at least one of the plurality of channel input terminals, each of the detecting circuits including a resistor connected to at least one of the plurality of channel input terminals and a first diode, an anode of the first diode being connected to the resistor, a cathode of the first diode being connected to a second common node; and a second rectifying part including a second diode including an anode connected to the second common node, a third diode including an anode connected to a cathode of the second diode and a cathode connected to the feedback terminal, and a capacitor including a first end connected between the second and third diodes and a second end connected to ground.

12. The light source apparatus of claim 11, wherein the protection part comprises:

a second comparator including a second input terminal connected to the second common node, a second reference terminal which receives the second reference voltage and an output terminal connected to the driving voltage generating part.

13. The light source apparatus of claim 12, wherein a level of the second reference voltage is determined according to a number of shorted light sources.

14. The light source apparatus of claim 7, wherein the multichannel current control part comprises:
- a plurality of control transistors connected to each of the plurality of channel input terminals, respectively;
- a plurality of operational amplifiers, each of the plurality of operational amplifiers including a reference terminal receiving a reference voltage, an input terminal connected to an output electrode of an individual control transistor of the plurality of control transistors, and an output terminal connected to a control electrode of an individual control transistor of the plurality of control transistors; and
- a plurality of driving transistors, each of the plurality of driving transistors including an input electrode connected to the output electrode of one of the plurality of control transistors, respectively, a control electrode which receives the driving signal, and an output electrode connected to ground.

15. A display apparatus comprising:
- a display panel;
- a light source module including a plurality of light source strings connected in parallel with each other, each of the plurality of light source strings including a plurality of light sources connected in series;
- a driving voltage generating part including:
- an output terminal which provides the light source module with a driving voltage; and
- a feedback terminal connected to the output terminal,
- wherein the driving voltage generating part controls a level of the driving voltage according to a feedback voltage of the feedback terminal;
- a light source driving part which generates a plurality of driving signals which control the luminance of the plurality of light source strings;
- a multichannel current control part including a plurality of channel input terminals connected to the plurality of light source strings, respectively, wherein the multichannel current control part controls a resistance difference of the plurality of light source strings based on the plurality of driving signals;
- a feedback current control part which adjusts a flow of a current through the feedback terminal according to a detection voltage detected from the plurality of channel input terminals based on the plurality of driving signals;
- a first current feedback part which decreases a level of a feedback voltage of the feedback terminal by connecting the feedback terminal to ground when the detection voltage is less than a first reference voltage; and
- a second current feedback part which increases the level of the feedback voltage of the feedback terminal via at least partially flowing current toward the feedback terminal when the detection voltage is greater than the feedback voltage.

16. The display apparatus of claim 15, wherein the feedback current control part comprises:
- a signal input part including a plurality of signal input terminals which receive the plurality of driving signals, respectively, the plurality of signal input terminals being electrically connected to the plurality of channel input terminals, respectively;
- a protection part which blocks the driving voltage provided to the light source strings when the detection voltage is greater than a second reference voltage.

17. The display apparatus of claim 16, wherein the first current feedback part comprises:
- a first rectifying part including a plurality of diodes, anodes of the plurality of diodes being connected to the plurality of channel input terminals, respectively, cathodes of the plurality of diodes being connected to a first common node;
- a first comparator including a first input terminal connected to the first common node and a first reference terminal which receives the first reference voltage; and
- a transistor including a control electrode connected to an output terminal of the first comparator, an input electrode connected to the feedback terminal and an output electrode connected to ground.

18. The display apparatus of claim 16, wherein the second current feedback part comprises:
- a detecting part including a plurality of detecting circuits connected to the plurality of channel input terminals, respectively, each of the plurality of detecting circuits including a resistor connected to at least one of the plurality of channel input terminals, respectively, and a first diode, an anode of the first diode being connected to the resistor, a cathode of the first diode being connected to a second common node; and
- a second rectifying part including a second diode including an anode connected to the second common node, a third diode including an anode connected to a cathode of the second diode and a cathode connected to the feedback terminal, and a capacitor including a first end connected between the second and third diodes and a second end connected to ground.

19. The display apparatus of claim 18, wherein the protection part comprises:
- a second comparator including a second input terminal connected to the second common node, a second reference terminal which receives a second reference voltage and an output terminal connected to the driving voltage generating part.

20. The display apparatus of claim 19, wherein a level of the second reference voltage is determined according to a number of shorted light sources.

* * * * *